United States Patent [19]

Coggins et al.

[11] 4,444,938
[45] Apr. 24, 1984

[54] PHENYLTETRALYLBUTANE AS VINYL PLASTICIZER

[75] Inventors: Eugene L. Coggins, Malvern; William D. Vanderwerff, West Chester, both of Pa.

[73] Assignee: Sun Tech, Inc., Philadelphia, Pa.

[21] Appl. No.: 385,958

[22] Filed: Jun. 7, 1982

[51] Int. Cl.³ ............................................. C08K 5/01
[52] U.S. Cl. .................................... 524/476; 524/477; 524/485
[58] Field of Search ......................... 524/476, 477, 485

[56] References Cited

U.S. PATENT DOCUMENTS 2,289,743 7/1942 Warner et al. ..................... 524/577
2,477,717 8/1949 Brandt ................................ 524/485

FOREIGN PATENT DOCUMENTS 507247 11/1954 Canada ............................... 524/476

Primary Examiner—Joseph L. Schofer
Assistant Examiner—N. Sarofim
Attorney, Agent, or Firm—J. Edward Hess; Donald R. Johnson

[57] ABSTRACT

Phenyltetralylbutane (PTB) is used to plasticize polyvinylchloride (PVC) resins. The PTB in one embodiment is prepared by refluxing tetralin an flowing condensed vapors of the tetralin over a bed of strongly acidic catalyst, which may for example be a synthetic acid "Y" type zeolite. In one embodiment, the PTB is used as a secondary plasticizer, with a primary plasticizer such as di(2-ethyl)hexyl phthalate.

10 Claims, 2 Drawing Figures

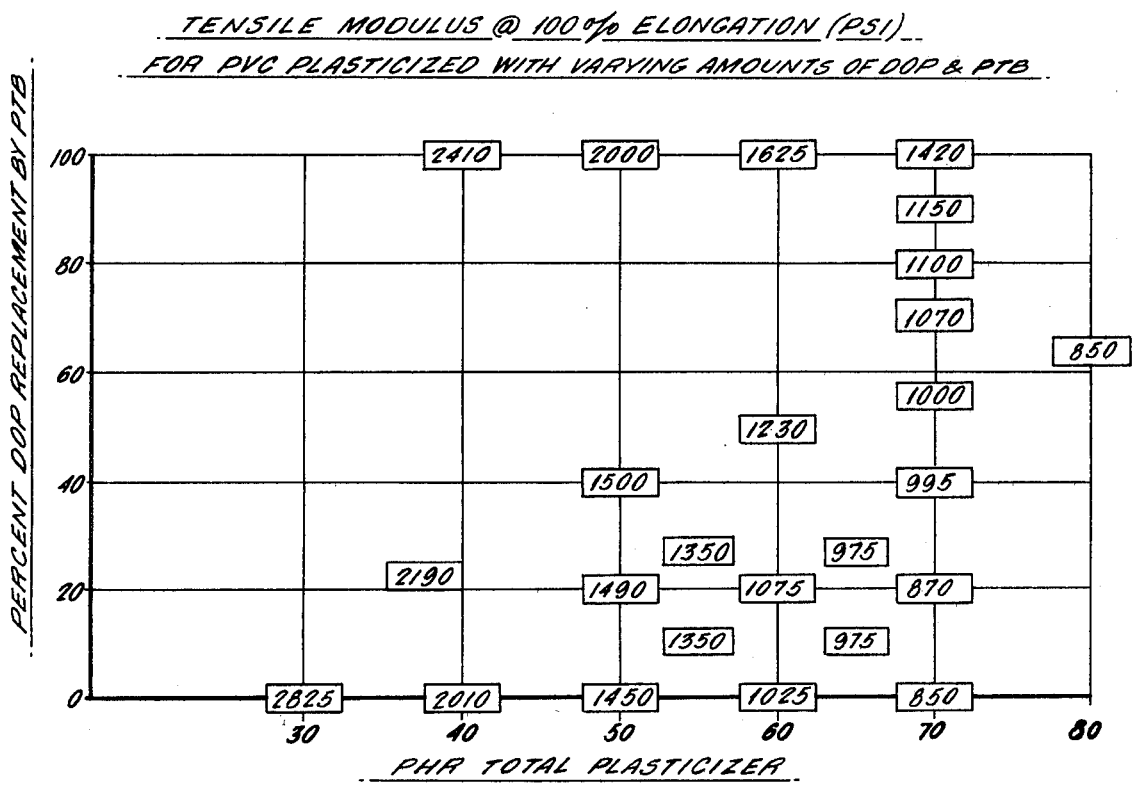
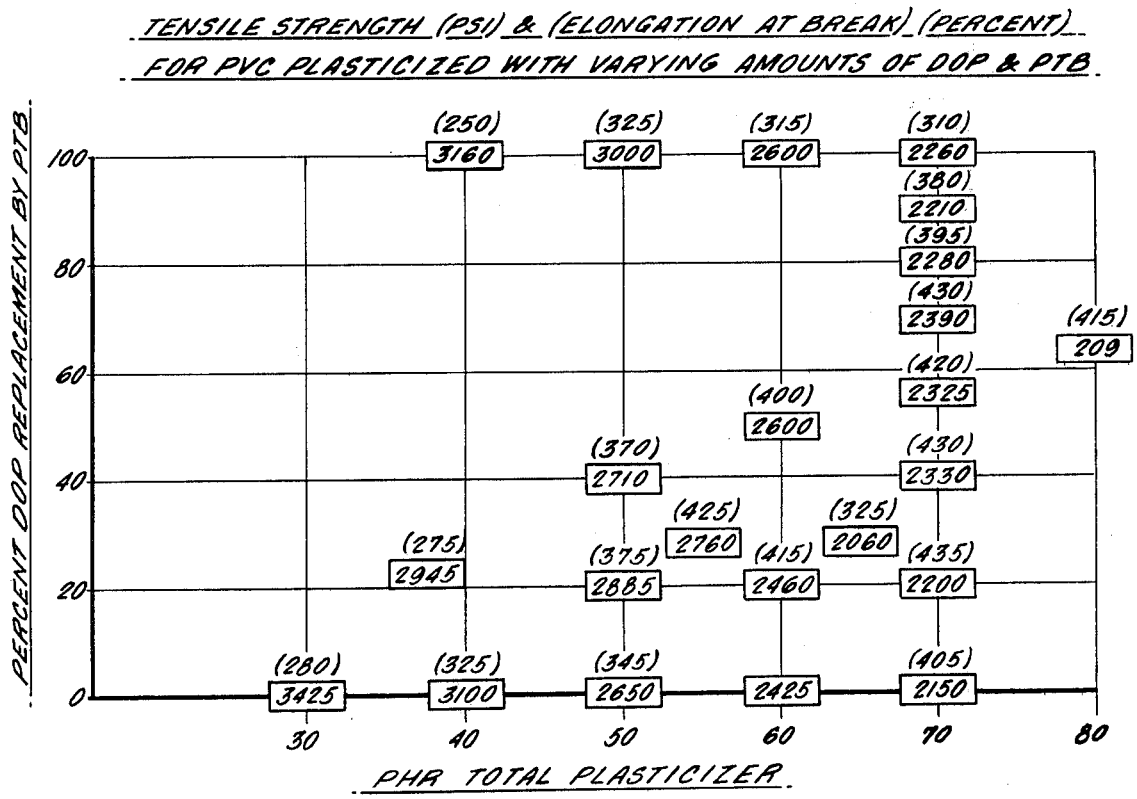

PHENYLTETRALYLBUTANE AS VINYL PLASTICIZER

BACKGROUND OF THE INVENTION

1-Phenyl-4-(2-tetralyl)butane and 1-phenyl-4-(1-tetralyl)butane, both known as PTB, are known compounds which are obtained by treating 1,2,3,4-tetrahydronaphthalene (tetralin) with a strong acid catalyst:

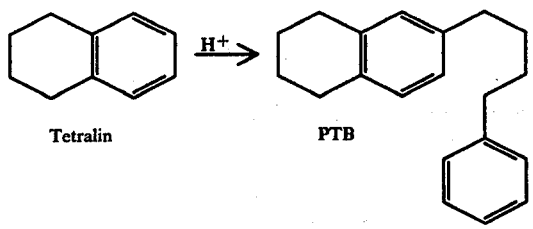

Tetralin        PTB

This reaction is discussed in Ber. 57B, 1990 (1924) and in U.S. Pat. No. 3,336,407 where it is pointed out that not only PTB, but other reaction products as well, such as sym-octahydroanthracene (OHA) and sym-octahydrophenanthrene (OHP) are formed. OHA and OHP are known to be plasticizers for polystyrene (U.S. Pat. Nos. 2,289,743 and 2,454,851) but, because of their high volatility they would be of little value for most plasticizer applications in polyvinylchloride (PVC) resins due to unacceptably low levels of permanence resulting from evaporative losses.

Alkylbiphenyls (U.S. Pat. No. 2,172,391), cyclohexylbiphenyls (U.S. Pat. No. 4,167,504) and partially hydrogenated terphenyls (U.S. Pat. Nos. 2,155,524 and 2,925,398) represent specific hydrocarbon types which have been said to be useful as vinyl plasticizers. These all have molecular weights in the approximate range of 180 to 240, again imparting to them a volatility too high for acceptable permanence in most PVC formulations. Although chemically quite distinct from the materials of the present invention, these materials are cited as hydrocarbon plasticizers of known compatibility, volatility and plasticization efficiency for the purpose of comparison.

STATEMENT OF THE INVENTION

In accord with this invention PTB is an effective plasticizer for PVC resins and will be employed either alone as the primary plasticizer or as a secondary plasticizer in conjunction with conventional plasticizers normally used with PVC resins such as di(2-ethyl)hexyl phthalate (DOP). The higher molecular weight of PTB (264) imparts a desired lower volatility and its unique structure combining aromatic, alicyclic and aliphatic segments in a very flexible molecular arrangement is apparently the basis for its improved compatibility. A most striking feature of PTB for PVC plasticization is its combination of high compatibility with vinyl resins and adequate plasticization efficiency. This combination permits PTB to be used at high replacement levels as a secondary plasticizers, and, as indicated, even to be used as a primary plasticizer. The invention embodies PVC resins plasticized with PTB and the process of effecting such plasticization. Also included in the invention is an improved method for making PTB.

REFERENCE TO DRAWINGS

FIG. 1 is a graphic display of tensile modululus of the plasticized compositions of the invention.

FIG. 2 is a graphic display of tensile strength of the plasticized compositions of the invention.

DETAILED DESCRIPTION OF THE INVENTION

It will be understood that reaction product mixtures as described above may be used as the plasticizer in this invention as long as the PTB content predominates. Because PTB has a higher reactivity toward the highly acidic catalysts needed for this reaction than does tetralin, attempts to increase the conversion of tetralin result in converting PTB to secondary products, mainly OHA and OHP. As a result, the methods for its preparation described by Schroeter in Ber. 57B, 1990 (1924) and Bushick in U.S. Pat. No. 3,336,407 are not particularly well suited for producing PTB in high yield. Therefore, a preferred method for making PTB in high yield for use in this invention involves refluxing tetralin vapors over a bed of a synthetic acidic "Y" type zeolite such as Linde SK-500, Linde LZ-Y82, or any of the more acid types of the Mobile ZFM series of shape selective zeolites. A particularly useful way to do this is to place the catalyst in the thimble of a Soxhlet extraction apparatus or of a simplified version of such an apparatus from which the siphoning action has been eliminated and the tetralin to be reacted is placed in the flask of the extraction apparatus. Alternative techniques using a bed of catalyst through which condensed vapors of the tetralin flows may also be used. In this manner the very reactive PTB has minimal contact with the catalyst and becomes concentrated in the flask. As much as 95% of the tetralin can be converted in this fashion and the product will be comprised of as much as 95% PTB. This mixture can then be distilled under vaccum to remove the small amount of unreacted tetralin and both low and high-boiling by-products to yield a water-white product.

Use of the PTB or its mixtures will be in the conventional manner for plasticizing operations and such techniques are well known in the art. When used to replace a portion of the conventional plasticizer about 20% to about 90% of the conventional plasticizer may be replaced with good results. In order to obtain miximum benefit as a replacement plasticizer, about 50% to 90% of the primary plasticizer will be replaced with PTB. The following Tables illustrate the results obtained in various runs for the plasticizing of PVC resin where all or a part of the conventional plasticizer (DOP) is replaced with PTB in varying amounts.

TABLE I

Tensile Data For PTB Plasticized PVC Resins

| Run No. | Total Plasticizer (PHR) | % DOP Replaced | Tensile Strength Initial | Tensile Strength A-ged | % Elongation Initial | % Elongation A-ged | Modulus at 100% Elong. Initial | Modulus at 100% Elong. A-ged |
|---|---|---|---|---|---|---|---|---|
| 1 | 30 | 0 | 3100 | 2925 | 275 | 275 | 2675 | 2600 |
|   |    |   | 3025 | 2900 | 250 | 275 | 2600 | 2700 |
|   |    |   | 3025 | 2900 | 250 | 225 | 2600 | 2675 |
|   |    |   | 3075 | 2925 | 250 | 250 | 2750 | 2700 |
| 2 | 38 | 21 | 2975 | 2825 | 300 | 275 | 2225 | 2250 |
|   |    |    | 2950 | 2900 | 300 | 275 | 2125 | 2350 |
|   |    |    | 2950 | 2825 | 275 | 250 | 2175 | 2350 |
|   |    |    | 2900 | 2825 | 225 | 250 | 2225 | 2450 |
| 3 | 50 | 0 | 2650 | 2375 | 325 | 275 | 1550 | 1450 |
|   |    |   | 2750 | 2500 | 375 | 300 | 1550 | 1450 |

TABLE I-continued

Tensile Data For PTB Plasticized PVC Resins

| Run No. | Total Plasticizer (PHR) | % DOP Replaced | Tensile Strength Initial | Tensile Strength Aged | % Elongation Initial | % Elongation Aged | Modulus at 100% Elong. Initial | Modulus at 100% Elong. Aged |
|---|---|---|---|---|---|---|---|---|
|   |   |   | 2650 |   | 325 |   | 1550 |   |
|   |   |   | 2625 |   | 325 |   | 1550 |   |
| 4 | 50 | 40 | 2675 | 2625 | 325 | 300 | 1525 | 1700 |
|   |   |   | 2750 | 2625 | 400 | 275 | 1500 | 2000 |
|   |   |   | 2750 | 2625 | 375 | 275 | 1500 | 1875 |
|   |   |   | 2650 | 2650 | 375 | 300 | 1475 | 1950 |
| 5 | 60 | 50 | 2600 | 2450 | 400 | 375 | 1200 | 1350 |
|   |   |   | 2575 | 2500 | 475 | 300 | 1150 | 1650 |
|   |   |   | 2525 | 2625 | 400 | 325 | 1200 | 1675 |
|   |   |   | 2600 | 2150 | 400 | 200 | 1225 | 1650 |
| 6 | 70 | 0 | 2025 | 2025 | 375 | 450 | 875 | 775 |
|   |   |   | 2050 | 2150 | 400 | 450 | 825 | 825 |
|   |   |   | 1950 | 2075 | 375 | 450 | 800 | 775 |
|   |   |   | 2075 | 2075 | 400 | 425 | 850 | 850 |
| 7 | 70 | 20 | 2250 | 2225 | 450 | 450 | 875 | 850 |
|   |   |   | 2175 | 2025 | 425 | 400 | 875 | 800 |
|   |   |   | 2100 | 1800 | 375 | 275 | 875 | 875 |
|   |   |   | 2250 | 1800 | 450 | 300 | 875 | 875 |
| 8 | 70 | 40 | 2325 | 2150 | 400 | 400 | 1025 | 925 |
|   |   |   | 2325 | 2025 | 450 | 300 | 1000 | 1025 |
|   |   |   | 2275 | 2150 | 425 | 375 | 1000 | 1025 |
|   |   |   | 2400 | 2175 | 450 | 350 | 950 | 975 |
| 9 | 70 | 57.1 | 2275 | 2250 | 400 | 375 | 1000 | 950 |
|   |   |   | 2325 | 2300 | 425 | 300 | 1000 | 1200 |
|   |   |   | 2300 | 2275 | 400 | 350 | 1000 | 1125 |
|   |   |   | 2400 | 2250 | 450 | 350 | 1000 | 1175 |
| 10 | 70 | 70 | 2475 | 2325 | 450 | 325 | 1100 | 1275 |
|   |   |   | 2400 | 2500 | 425 | 375 | 1050 | 1350 |
|   |   |   | 2325 | 2275 | 400 | 300 | 1075 | 1300 |
|   |   |   | 2350 | 2325 | 450 | 350 | 1050 | 1150 |
| 11 | 70 | 80 | 2300 |   | 400 |   | 1200 |   |
|   |   |   | 2300 |   | 400 |   | 1050 |   |
|   |   |   | 2275 |   | 400 |   | 1025 |   |
|   |   |   | 2250 |   | 375 |   | 1125 |   |
| 12 | 70 | 90 | 2250 |   | 350 |   | 1175 |   |
|   |   |   | 2125 |   | 350 |   | 1125 |   |
|   |   |   | 2275 |   | 400 |   | 1200 |   |
|   |   |   | 2175 |   | 425 |   | 1100 |   |
| 13 | 70 | 100 | 2275 |   | 300 |   | 1500 |   |
|   |   |   | 2200 |   | 300 |   | 1400 |   |
|   |   |   | 2250 |   | 300 |   | 1425 |   |
|   |   |   | 2300 |   | 325 |   | 1350 |   |
| 14 | 80 | 62.5 | 2025 | 2225 | 400 | 400 | 850 | 925 |
|   |   |   | 2025 | 2150 | 400 | 375 | 850 | 950 |
|   |   |   | 2175 | 2150 | 425 | 375 | 825 | 975 |
|   |   |   | 2150 | 2175 | 425 | 375 | 875 | 1000 |

TABLE II

Tensile Data For PTB Plasticized PVC Resins

| Run No. | Total Plasticizer (PHR) | % DOP Replaced | Tensile Strength Initial | Tensile Strength Aged | % Elongation Initial | % Elongation Aged | Modulus at 100% Elong. Initial | Modulus at 100% Elong. Aged |
|---|---|---|---|---|---|---|---|---|
| 1 | 40 | 0 | 3075 | 3125 | 300 | 275 | 2000 | 2500 |
|   |   |   | 3200 | 2950 | 325 | 225 | 2050 | 2300 |
| 2 | 40 | 100 | 3225 | 4250 | 275 | <100 | 2425 | — |
|   |   |   | 3100 | 4550 | 225 | <100 | 2400 | — |
| 3 | 50 | 0 | 2300 | 2600 | 250 | 300 | 1425 | 1525 |
|   |   |   | 2800 | 2625 | 375 | 300 | 1425 | 1500 |
| 4 | 50 | 20 | 2825 | 2800 | 350 | 300 | 1475 | 1700 |
|   |   |   | 2945 | 2800 | 400 | 300 | 1500 | 1825 |
| 5 | 50 | 100 | 3000 | 4125 | 325 | 75 | 2000 | — |
|   |   |   | — | 4650 | — | 100 | — | 4050 |
| 6 | 55 | 11 | 2650 | 2275 | 375 | 225 | 1250 | 1475 |
|   |   |   | 2825 | 2775 | 400 | 300 | 1450 | 1675 |
| 7 | 55 | 27 | 2750 | 2925 | 425 | 275 | 1250 | 2075 |
|   |   |   | 2775 | 2850 | 425 | 275 | 1450 | 2100 |
| 8 | 60 | 0 | 2375 | 2275 | 425 | 250 | 950 | 1400 |
|   |   |   | 2475 | 2325 | 425 | 250 | 1100 | 1500 |
| 9 | 60 | 20 | 2525 | 2650 | 425 | 275 | 1050 | 1900 |
|   |   |   | 2400 | 2800 | 400 | 300 | 1100 | 1950 |
| 10 | 60 | 50 | 2650 | 2900 | 400 | 275 | 1300 | 2200 |
|   |   |   | 2650 | 2950 | 400 | 275 | 1295 | 2200 |
| 11 | 60 | 100 | 2650 | 4275 | 325 | 50 | 1625 | — |
|   |   |   | 2550 | 3675 | 300 | 50 | 1625 | — |
| 12 | 65 | 11 | 2250 | 2300 | 425 | 325 | 975 | 2225 |
|   |   |   | 2350 | 2250 | 425 | 325 | 975 | 2150 |
| 13 | 65 | 27 | 2125 | 2100 | 325 | 300 | 1000 | 2100 |
|   |   |   | 2000 | 2300 | 325 | 325 | 950 | 2250 |
| 14 | 70 | 20 | 2250 | 2350 | 450 | 375 | 850 | 2175 |
|   |   |   | 2200 | 2250 | 450 | 375 | 875 | 2025 |

TABLE III

Non-Tensile Data For PTB Plasticized PVC Resins

| Total Plasticizer (PHR) | % DOP Replaced | Hardness Initial | Hardness Aged | Volatility (%) |
|---|---|---|---|---|
| 30 | 0 | 91.0 | 88.3 | 0.50 |
| 38 | 21 | 83.3 | 83.4 | 1.80 |
| 40 | 0 | 81.3 | 80.0 | 1.16 |
| 40 | 100 | 82.6 | 90.3 | 6.75 |
| 50 | 0 | 76.5 | 72.7 | 1.39 |
| 50 | 20 | 74.6 | 70.7 | 3.09 |
| 50 | 40 | 78.5 | 70.5 | 3.15 |
| 50 | 100 | 79.0 | 90.3 | 7.00 |
| 55 | 11 | 72.6 | 61.3 | 1.98 |
| 55 | 27 | 71.6 | 71.3 | 2.69 |
| 60 | 0 | 69.6 | 68.3 | 1.01 |
| 60 | 20 | 70.6 | 67.3 | 2.22 |
| 60 | 50 | 70.5 | 71.0 | 3.92 |
| 60 | 100 | 76.7 | 86.7 | 4.65 |
| 65 | 11 | 71.7 | 66.7 | 1.38 |
| 65 | 27 | 67.6 | 68.3 | 1.99 |
| 70 | 0 | 66.0 | 61.7 | 2.29 |
| 70 | 20 | 65.8 | 63.6 | 2.54 |
| 70 | 40 | 68.7 | 64.7 | 3.86 |
| 70 | 57.1 | 69.3 | 66.0 | 5.30 |
| 70 | 70 | 69.6 | 67.6 | 6.31 |
| 80 | 62.75 | 65.3 | 62.7 | 5.83 |

The above data is best evaluated by reference to the graphic displays of FIG. 1 and FIG. 2.

These figures provide a graphic display of the way the key tensile properties (ultimate tensile strength, elongation at break and tensile modulus at 100 percent elongation) are distributed over a broad range of PVC formulations incorporating the hydrocarbon plasticizer phenyltetralylbutane. Data is given for PVC plasticized with DOP in which amounts of the DOP varying from 0 to 100 percent have been replaced by PTB and for amounts of total plasticizer (combined DOP and PTB) varying from 30 to 80 parts per hundred parts by weight of PVC resin. Thus, the data at 70 PHR and 70 percent replacement are for a formulation containing 100 parts PVC resin, 28 parts DOP and 42 parts PTB. As long as the plasticizer remains fully compatible with the resin at the level used, the tensile modulus at 100 percent elongation (FIG. 1) provides a good indication of the plasticization efficiency of the plasticizer; the lower the value at a given loading, the softer and more flexible is the formulation. By comparing the values for formulations plasticized by DOP along (0 percent replacement) with those of formulations containing PTB, it is seen that the values increase steadily as the amount of DOP replaced by PTB increases. This shows that PTB is less efficient as a plasticizer than DOP. However, the rather small increases in tensile modulus as shown by the numbers in the boxes (especially at replacements below 50 percent) indicates that the plasticization efficiency of PTB is not notably inferior to that of DOP.

FIG. 2 displays the tensile strength and elongation at break of the same PVC formulations represented in FIG. 1. The constancy of these values over the total range of replacement of DOP by PTB is good indication of the compatibility of PTB and DOP-PTB mixtures with PVC resin in these formulations and other more qualitative tests corroborate the good efficiency of PTB as a PVC plasticizer. Thus, the appearance, feel, lack of color, and other general qualitative properties all establish the good compatibility and plasticization efficiency of PTB for PVC.

We claim:

1. In the process of plasticizing polyvinylchloride the improvement of using phenyltetralylbutane as plasticizer.

2. In the process of plasticizing polyvinylchloride using primary and secondary plasticizers, the improvement of using phenyltetralylbutane as the secondary plasticizer.

3. The process of claim 2 wherein the primary plasticizer is di(2-ethyl)hexyl phthalate.

4. The process of claims 1, 2 or 3 wherein about 50% to about 90% of the primary plasticizer is placed with said secondary plasticizer.

5. PVC resin plasticized with phenyltetralylbutane.

6. PVC resin plasticized with a primary and secondary plasticizer wherein the secondary plasticizer is phenyltetralylbutane.

7. The PVC resin of claim 6 wherein the primary plasticizer is di(2-ethyl)hexyl phthalate.

8. The PVC resin of claim 6 or 7 wherein about 50% to about 90% of the primary plasticizer is replaced with phenyltetralylbutane.

9. An improved process of making phenyltetralylbutane which comprises refluxing tetralin and flowing condensed vapors of said tetralin over a bed of strongly acidic solid catalyst.

10. The process of claim 9 wherein the catalyst is a synthetic acid "Y" type zeolite.

* * * * *